Palmer & Williams
Harvester Rake
No 1109
No 4
Reissued Jan. 1, 1861.
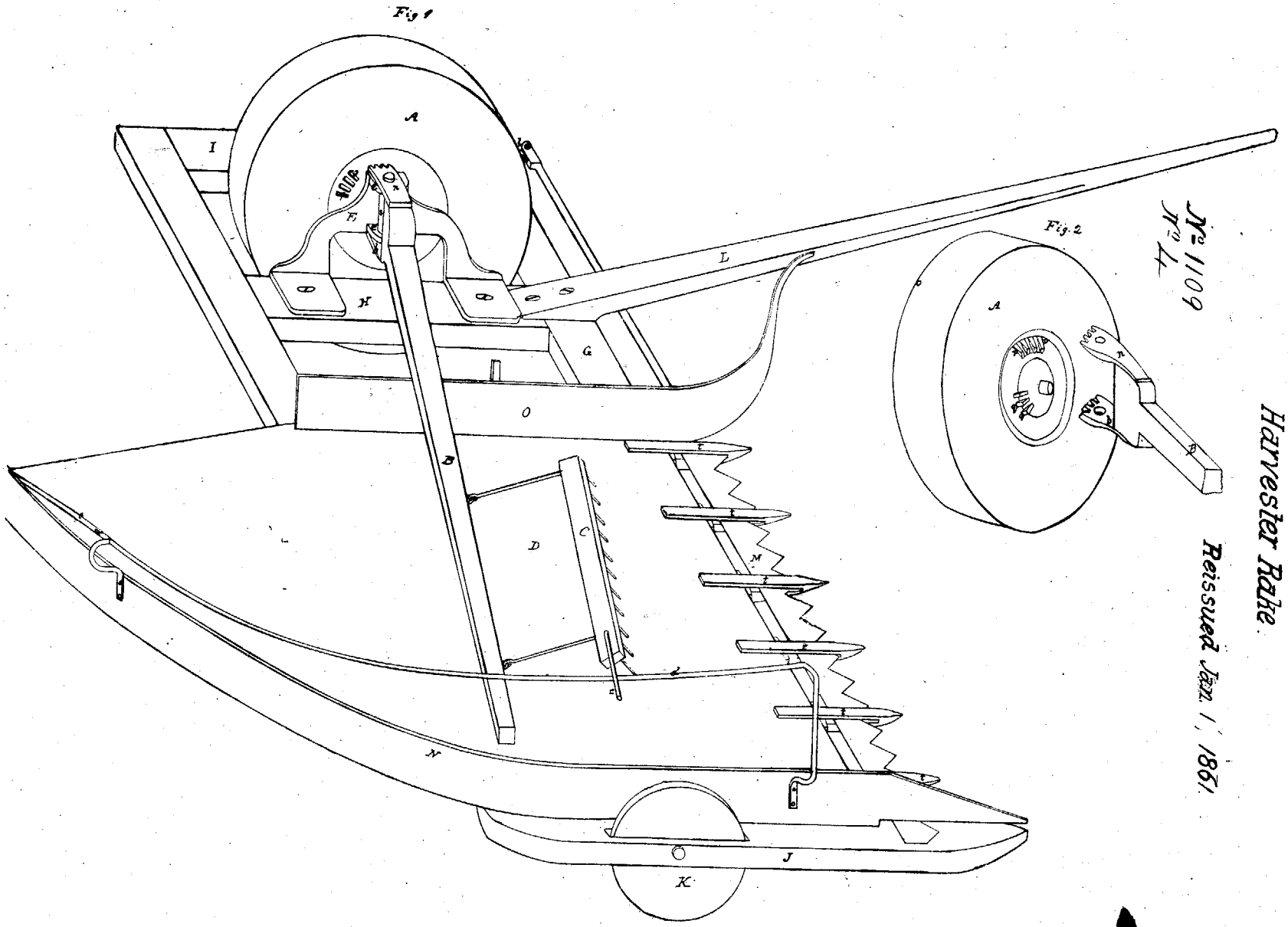

UNITED STATES PATENT OFFICE.

A. PALMER AND S. G. WILLIAMS, OF BROCKPORT, NEW YORK, ASSIGNORS, BY MESNE ASSIGNMENTS, TO D. S. MORGAN, WM. H. SEYMOUR, S. G. WILLIAMS, AND AARON PALMER.

IMPROVEMENT IN HARVESTERS.

Specification forming part of Letters Patent No. 8,192, dated July 1, 1851; Reissue No. 305, dated April 10, 1855; Reissue No. 1,109, dated January 1, 1861.

*To all whom it may concern:*

Be it known that we, AARON PALMER, of Brockport, in the county of Monroe and State of New York, and STEPHEN G. WILLIAMS, formerly of the same place, but now of Janesville, in the county of Rock and State of Wisconsin, have invented a new and Improved Harvesting-Machine; and we do hereby declare that the following is a full, clear, and exact description thereof, reference being had to the accompanying drawings, making a part of this specification, in which—

Figure 1 represents a view in perspective of a harvesting-machine to which our improvements are applied; and Fig. 2, a similar view of the driving-wheel and a portion of the vibrating arm or lever which carries the rake, showing more particularly the mechanism by which the latter is operated.

The invention claimed under this patent consists in arranging an automatic sweep-rake in such relation to a quadrant-shaped platform, upon which the grain falls as it is cut, that it shall vibrate over the same at suitable intervals to discharge the cut grain upon the ground.

The accompanying drawings represent a convenient arrangement of parts for carrying out the object of our invention.

The frame is composed of three longitudinal beams, H I J, and two transverse beams, F G, the whole being securely fastened to each other at their points of intersection. The main or driving wheel A is placed between the outer longitudinal beam, I, and the central beam, H, and has its bearings in arched supports or brackets E, rising from each of these beams.

Guard-fingers *t*, through which a sickle, M, vibrates, are secured upon the front edge of a platform, D, upon which the heads and upper portion of the stalks of grain fall as they are severed by the cutting apparatus, which may be constructed and operated in any suitable manner. This platform is shaped like a quadrant or sector of a circle, of which the arm or lever which carries the rake-head forms the radius, and the fulcrum-pin on which said lever vibrates the center, in order that the grain may be swept round on an arc of a circle and be discharged upon the ground behind the driving-wheel. A tongue for the team to draw by is secured rigidly to the frame in line with the central beam, H, and projects forward at a right angle, or thereabout, to the front edge of the frame. A fence or guard, O, which may either be made straight or curved to correspond with the sweep of the inner end of the rake, arises from the inner edge of the platform and prevents the grain from falling off or becoming entangled in the gearing. The front end of this guard may also be curved outward and secured to the tongue, and thus act as a guide to bring the grain in toward the cutting apparatus. A curved fence or guard, N, rises from the outer edge of the platform, with which it corresponds in curvature, and serves to prevent the grain from being deflected from its path or thrown from the platform by the centrifugal force generated by the vibrating movements of the rake.

The vibrating arm or lever B, which carries the rake, has lugs or projections *n b* secured upon the upper and lower sides of its inner end, on each of which lugs cogs or teeth are arranged, so as to form a rack. These plates embrace brackets or ears *e e*, projecting horizontally from the wheel-support E, and are held in place by a fulcrum-pin, S, which passes through both ears and lugs. This fulcrum-pin thus serves not only to hold the arm or lever B in a horizontal position without support at its outer end, but also forms the center of motion on which it vibrates freely over the platform. This arm or lever is vibrated by means of teeth or cogs secured upon the inner face of the driving-wheel in such manner as to form segments of a pinion, as shown in Fig. 2. The teeth *q* of the segment which gears into the rack on the lower lug, *b*, of the arm or lever B are placed nearer to the axis of the driving-wheel than the teeth *p* of the segment which gears into the rack of the upper lug, *n*, of the lever. This arrangement is necessary in order that each segment of a pinion or set of teeth may gear only with its own rack. The teeth *q* of the inner segment project outwardly, while those *p* of the outer set project inwardly.

The rake-head C, into which the rake-teeth are inserted, may be connected to the operating-lever B by any suitable hinge or joint that will allow it the proper degree of vertical play. A guide-rod, *c*, projects from the outer end of the rake-head in the same axial plane, for a purpose hereinafter explained. A guide-rail, *d*, which slopes gradually from front to rear of the machine, is supported above the outer frame, N, with which it conforms in curvature, by means of brackets $d'$ $d^2$, curved outwardly, to permit the end of the guide-rod *c* to travel beneath the guide-rail when running backward. A short section of the rear end of the rail *d* is hinged, so as to form a joint or gate, *f*, capable of moving vertically on its pivot, the rear end of which section rests upon the guard N. A guard-rail, *g*, having an upward inclination, surmounts the after end of the guard N. The outer or grain end of the machine is supported by a wheel, *k*, having its bearings in the outer longitudinal beam, J.

The operation of the machine is as follows: As the wheel to which the gearing is attached travels over the ground the machinery is set in motion, and the cutters sever the standing grain, which falls upon the platform. Suppose the rake to occupy the position shown in Fig. 1—that is, to be running forward. When in this position the teeth *q* are in gear with the rack *b*, and the rake-head C is held above the falling grain by the guide-rod *c* on its outer end sliding upon the inclined guide-rail *d*. The continued rotation of the driving-wheel causes the lever B (which always vibrates in the same horizontal plane) to push the rake before it until the guide-rod *c* has passed beyond the front end of the guide-rail *d*, when the rake drops suddenly upon the platfrom, its teeth striking into the butts of the fallen grain as it lies thereon. By this time the teeth *q* have escaped from the rack *b* and the forward movement of the rack ceases. The two sets of teeth *p* and *q* are arranged upon the face of the driving-wheel in such relation to each other that the moment the latter escapes from the lower rack, *b*, of the vibrating arm the former engage with the upper rack, *n*, and reverse the motion of the lever. The rake then travels backward, (describing an arc of a circle of which the fulcrum-pin S forms the center and the operating-lever B the radius,) drawing the grain with it, and discharges it heads foremost upon the ground behind the machine, with its stalks at right angles, or thereabout, thereto, and sufficiently removed from the standing grain to be out of the path of the team during their succeeding tour around the field. As the rake approaches its extreme rearward point the guide-rod *c* lifts the jointed rod *f* and passes beyond it, when the jointed rod immediately resumes its former place. The guard-rod *g* on the rear of the guard N prevents the rake from going back so far as to drop off the end of the guard. The teeth *p* and *q* are so arranged upon the driving-wheel that when the backward movement of the rake has ceased (by reason of the teeth *p* escaping from the upper rack, *n*) the teeth *q* do not immediately engage with lower rack, *b*, to start the rake forward, but the rake remains at rest while the driving-wheel makes about two-thirds of a revolution, by which means a sufficient pause is made to allow a quantity of grain sufficient to form a gavel to accumulate upon the platform. The rake then begins its forward movement, the guide-rod *c* now sliding on the inclined guide and elevating the rake-head until it reaches the front edge of the platform, when the rake falls and the operations above described are repeated.

By this description, then, it will be seen that the operation of the rake is such that it runs rapidly forward, (rising as it goes to pass over the fallen grain,) drops suddenly upon the platform, at once begins to move quickly back (drawing the grain off on an arc of a circle and discharging it behind the driving-wheel) until it reaches the termination of its backward movement, pauses a moment for a gavel to accumulate, and then moves rapidly forward, as before.

What we claim under this patent as our invention is—

Discharging the cut grain from a quadrant-shaped platform, on which it falls as it is cut, by means of an automatic sweep-rake sweeping over the same, substantially as described.

In testimony whereof we have hereunto subscribed our names.

AARON PALMER.
STEPHEN G. WILLIAMS.

Witnesses:
T. H. SPARROW,
D. S. MORGAN.